(12) United States Patent
Little et al.

(10) Patent No.: US 7,565,041 B2
(45) Date of Patent: Jul. 21, 2009

(54) SYMMETRIC OPTICAL CIRCUIT WITH INTEGRATED POLARIZATION ROTATOR

(75) Inventors: Brent E. Little, Glen Head, NY (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/925,221

(22) Filed: Oct. 26, 2007

(65) Prior Publication Data
US 2009/0110344 A1    Apr. 30, 2009

(51) Int. Cl.
*G02B 6/26*    (2006.01)
(52) U.S. Cl. .............................. 385/11; 385/14; 385/39
(58) Field of Classification Search .................. None
See application file for complete search history.

(56) References Cited
U.S. PATENT DOCUMENTS

| | | | | |
|---|---|---|---|---|
| 3,955,202 | A * | 5/1976 | Young ......................... | 343/756 |
| 4,142,775 | A   | 3/1979 | Ramaswamy et al. | |
| 4,153,328 | A * | 5/1979 | Wang .......................... | 385/28 |
| 4,220,395 | A * | 9/1980 | Wang et al. .................. | 385/11 |
| 4,691,984 | A * | 9/1987 | Thaniyavarn .................. | 385/8 |
| 4,781,424 | A * | 11/1988 | Kawachi et al. ............. | 385/132 |
| 4,966,431 | A * | 10/1990 | Heismann ................... | 385/11 |
| 5,078,512 | A * | 1/1992 | Ando .......................... | 385/11 |
| 5,140,654 | A * | 8/1992 | Akasaka et al. ............... | 385/8 |
| 5,185,828 | A * | 2/1993 | van der Tol ................. | 385/28 |
| 5,218,653 | A * | 6/1993 | Johnson et al. .............. | 385/11 |
| 5,243,669 | A * | 9/1993 | Alferness et al. ............. | 385/11 |
| 5,263,102 | A   | 11/1993 | Hakogi | |
| 5,351,317 | A * | 9/1994 | Weber ......................... | 385/3 |
| 5,361,320 | A * | 11/1994 | Liu et al. .................... | 385/143 |
| 5,392,142 | A   | 2/1995 | Mitsutake et al. | |
| 5,396,365 | A * | 3/1995 | Gustavsson ................. | 359/337 |
| 5,446,807 | A * | 8/1995 | Baran et al. .................. | 385/11 |
| 5,535,001 | A   | 7/1996 | Tajima | |
| 5,539,845 | A * | 7/1996 | van der Tol .................. | 385/11 |
| 5,638,473 | A   | 6/1997 | Byron | |
| 5,661,825 | A * | 8/1997 | Van Dam et al. ............. | 385/11 |

(Continued)

FOREIGN PATENT DOCUMENTS

WO    WO 9307653    4/1993

OTHER PUBLICATIONS

Y. Inoue et al. Elimination of polarization sensitivity in silica-based wavelength division multiplexer using a polyimide half waveplate. Journal of Lightwave Technology, 15:10:1947-1957, Oct. 1997.*

(Continued)

*Primary Examiner*—Sung H Pak
*Assistant Examiner*—Mike Stahl
(74) *Attorney, Agent, or Firm*—Dunlap, Codding & Rogers, P.C.; David L. Soltz (57) ABSTRACT

The present invention is directed to an on-chip symmetric optical circuit having one or more integrally fabricated polarization rotators forming a monolithic, solid state polarization independent symmetric circuit. The symmetric optical circuit has at least one integrally fabricated rotator positioned in a plane of symmetry of at least one optical fiber, waveguide or circuit path of the symmetric optical circuit. The folded symmetric optical circuit may be for example a Mach-Zehnder type optical circuit or an arrayed waveguide grating optical circuit.

8 Claims, 8 Drawing Sheets

U.S. PATENT DOCUMENTS

| | | | |
|---|---|---|---|
| 5,708,734 A * | 1/1998 | Van Der Tol | 385/11 |
| 5,832,146 A * | 11/1998 | Bruno | 385/11 |
| 6,011,641 A * | 1/2000 | Shin et al. | 359/251 |
| 6,104,850 A * | 8/2000 | Dong | 385/29 |
| 6,404,946 B1 | 6/2002 | Nakajima et al. | |
| 6,498,878 B1 | 12/2002 | Ueda | |
| 6,625,364 B2 * | 9/2003 | Johnson et al. | 385/127 |
| 6,697,553 B2 | 2/2004 | Bhardwaj et al. | |
| 6,720,840 B2 * | 4/2004 | Bohnet | 333/21 A |
| 6,721,467 B2 | 4/2004 | Olson | |
| 6,853,758 B2 * | 2/2005 | Ridgway et al. | 385/2 |
| 6,907,169 B2 * | 6/2005 | Vahala et al. | 385/50 |
| 7,006,234 B1 | 2/2006 | Cottrell et al. | |
| 7,016,571 B2 | 3/2006 | Joyner et al. | |
| 7,127,183 B2 | 10/2006 | Oguma | |
| 7,164,822 B2 | 1/2007 | Arakawa | |
| 7,228,015 B2 * | 6/2007 | Watts et al. | 385/11 |
| 2001/0046363 A1 * | 11/2001 | Purchase et al. | 385/140 |
| 2002/0181870 A1 * | 12/2002 | Inoue et al. | 385/37 |
| 2003/0072512 A1 * | 4/2003 | Nagaeda et al. | 385/11 |
| 2003/0081903 A1 * | 5/2003 | Vahala et al. | 385/50 |
| 2003/0099428 A1 * | 5/2003 | LoCascio et al. | 385/16 |
| 2005/0095741 A1 * | 5/2005 | Johnstone et al. | 438/31 |
| 2005/0254128 A1 * | 11/2005 | Watts | 359/558 |
| 2005/0265403 A1 * | 12/2005 | Anderson et al. | 372/20 |
| 2005/0271325 A1 * | 12/2005 | Anderson et al. | 385/40 |
| 2006/0018584 A1 * | 1/2006 | Watts et al. | 385/11 |
| 2006/0197629 A1 | 9/2006 | Pivit et al. | |

OTHER PUBLICATIONS

T. Lang et al. New passive polarization converter on glass substrate. IEEE Photonics Technology Letters, 10:9:1295-1297, Sep. 1998.*
M. Watts et al. Integrated mode-evolution-based polarization rotators. Optics Letters, 30:2:138-140, Jan. 2005.*

* cited by examiner

SYMMETRIC OPTICAL CIRCUIT WITH INTEGRATED POLARIZATION ROTATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In general, waveguides and optical circuits are devices or systems of material boundaries, that are designed to confine, direct, and act on propagated electromagnetic waves, such as light or optical signals.

An electromagnetic wave is a vector field that has two primary and orthogonal polarization states or vector directions associated with its propagation. These polarization states are generally referred to as the Transverse Electric (TE) mode and Transverse Magnetic (TM) mode for optical waveguides. In the TM mode, the magnetic lines of flux are predominantly oriented parallel to the substrate on which the waveguide sits, while in the TE mode the electric lines of flux are predominantly oriented parallel to the substrate.

Waveguides and optical circuits are polarization dependent in general because the effective index of the waveguide or network of coupled waveguides are polarization dependent. That is, the waveguides and other optical devices and their performance are often sensitive to the polarization state of the electromagnetic wave propagation.

Figure 1:
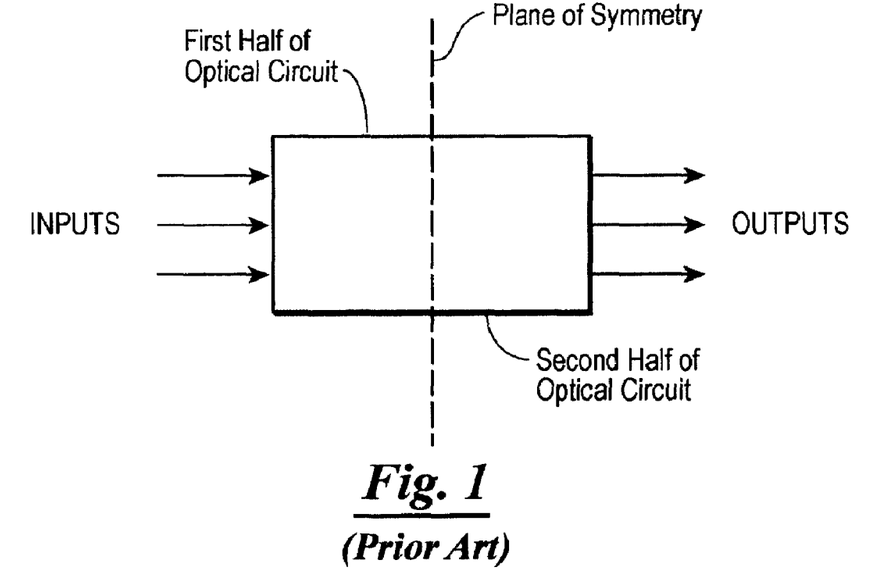
FIG. 1 is a schematic of a symmetric polarization dependent optical circuit.
Figure 2:
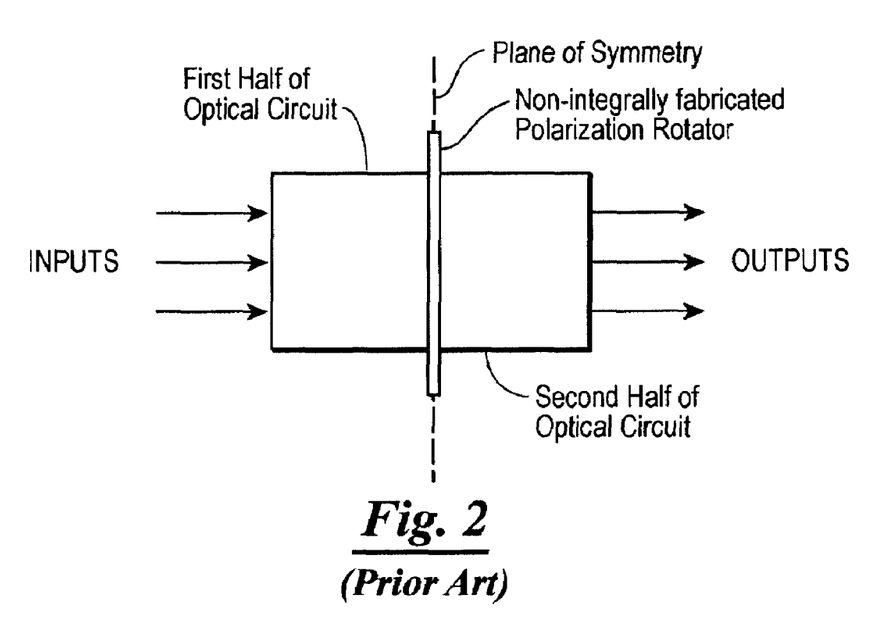
FIG. 2 is a schematic of a symmetric circuit having a halfwave plate polarization rotator.

Many optical circuits have folded symmetry. That is, the circuit has a first half and a second half about which the circuit can be "folded" or "mirror imaged". FIG. 1 represents a generic circuit previously known in the art which has a number of input ports, a number of output ports, and some plane of symmetry about which there is folded symmetry. The optical circuit can also have so called "point symmetry". That is, the circuit of FIG. 1 can be folded along the symmetry plane and also flipped top-to-bottom (as if the second half of the circuit was reflected through a point rather than a plane). In such circuits the optical response has been made polarization independent by inserting a polarization rotator (or polarization converter) at precisely the symmetry plane as represented in FIG. 2. The effect of the modification represented in FIG. 2 is that a signal goes through one half of the circuit in one polarization (e.g., TE mode), gets rotated to the orthogonal polarization (e.g., TM mode), then goes through the second half of the circuit (which is symmetric to the first half) in the orthogonal polarization. Each polarization signal thus goes through one-half of the circuit in one polarization mode, and through the other half of the device in the orthogonal polarization mode, thus causing equalization of the signals. For example, one polarization rotator which has been used in a folded symmetry circuit comprises a non-integral component such as a half wave plate such as may be constructed from a polymer or from a birefringent material such as quartz, rutile, calcite, lithium niobate or YV04. Such wave plates must be incorporated into the optical circuit separately from the construction of the optical circuit itself, for example after a slot has been made in the substrate upon which the optical circuit is disposed. Examples of symmetric circuits include Mach-Zehnder (MZ) circuits and Arrayed Waveguide Gratings (AWGs).

Figure 3:
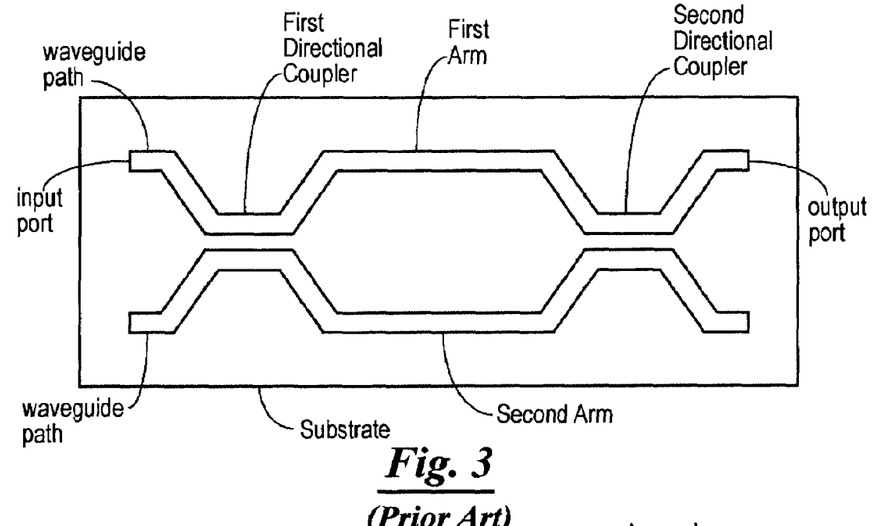
FIG. 3 is a schematic of a Mach-Zehnder-type optical circuit.
Figure 4:
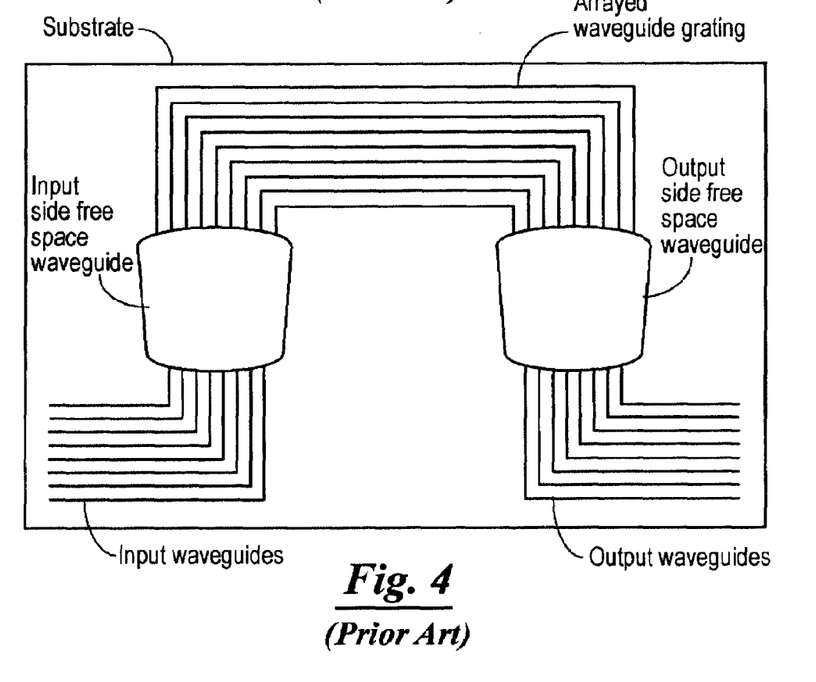
FIG. 4 is a schematic of an arrayed waveguide grating-type optical circuit.

In Mach-Zehnder circuits, a first waveguide path is split into two separate arms, which are then rejoined downstream, often after the signal in one arm has been subjected to an operation (FIG. 3). AWGs (for example as represented in FIG. 4) are commonly used as optical (de)multiplexers in wavelength division multiplexed (WDM) systems. These devices are capable of multiplexing a large number of wavelengths into a single optical fiber, thereby increasing the transmission capacity of optical networks considerably. The incoming light traverses a first free space and enters a bundle of optical fibers or channel waveguides. These fibers or waveguides have different lengths and thus apply a different phase shift to the signals passing therethrough. At the exit of the fibers or waveguides, the light traverses a second free space and interferes at the entries of the output waveguides which extend from the second free space in such a way that each output channel receives only light of a certain wavelength. Light entering the first free space is demultiplexed while in reverse is multiplexed.

Although polarization rotators at symmetry planes in symmetric circuits have been used in the past, such as polymer halfwave plates, as indicated above, no integrated optics polarization rotator has been previously known. It is an objective of the present invention to provide symmetric circuits constructed with integral rotators thereby providing monolithic solid state, robust polarization independent circuits.

BRIEF DESCRIPTION OF THE DRAWINGS

FIGS. 12A-12F cooperate to show one method for making a waveguide structure in accordance with the present invention using an etching technique. More particularly:

FIGS. 13A-13D cooperate to show another method for making a waveguide structure in accordance with the present invention using a layering technique. More particularly:

DETAILED DESCRIPTION OF THE INVENTION

The present invention is directed to an on-chip symmetric optical circuit having one or more integrally fabricated polarization rotators forming a monolithic, solid state polarization independent symmetric circuit. The symmetric optical circuit has at least one integrally fabricated rotator positioned in a plane of symmetry of at least one optical fiber or waveguide of the symmetric optical circuit.

The integrally fabricated polarization rotator of the present invention rotates the polarization of an electromagnetic signal as the electromagnetic signal propagates through the polarization rotator positioned in the plane of symmetry of the optical circuit described herein. A preferable use of the present invention is the conversion of a polarization dependent symmetric optical circuit into a polarization independent symmetric optical circuit wherein the polarization of a signal passing therethrough can be rotated by ninety degrees (or another desired degree of rotation) such that the signal is initially treated in one polarization, then rotated, then similarly treated or acted on in the alternate polarization state.

The polarization rotator of the present invention is an integrated optics component, unlike other types of polarization rotators (such as for example a high birefringent plate, which as discussed above must be mechanically placed in a slot cut into a waveguide circuit). Further, the rotator of the present invention does not require specialized materials such magneto optic, gyrotropic, electrooptic, anisotropic, or birefringent materials, and it does not require any externally applied fields or post-fabrication calibration. Also, the performance of the polarization rotator of the present invention is insensitive to exact geometry and device length, and is wavelength independent.

Figure 5:
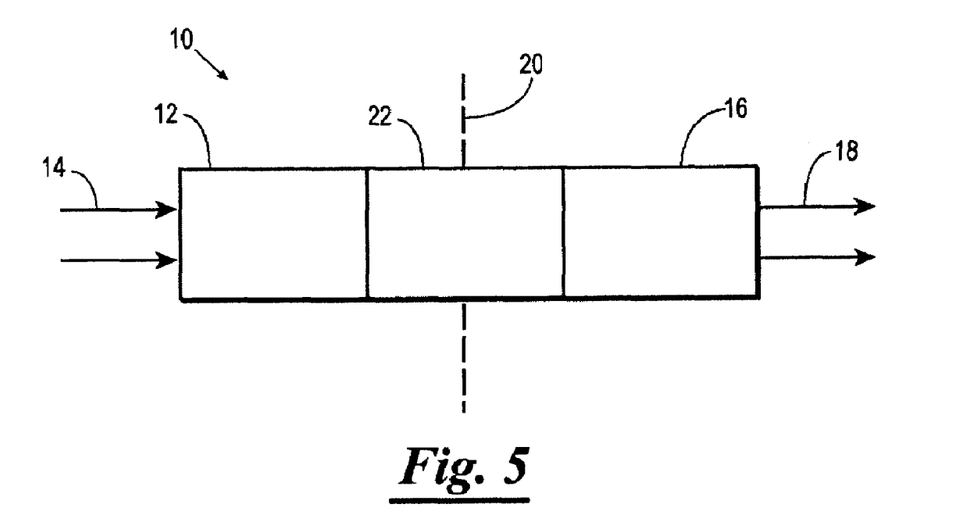
FIG. 5 is a schematic of a generalized optical circuit having an integrally fabricated polarization rotator constructed in accordance with the present invention.

Shown in FIG. 5 is a generalized example of the optical circuit of the present invention referred to therein by reference numeral 10. The optical circuit 10 comprises an input side 12 having inputs 14, and an output side 16 having outputs 18. The optical circuit 10 has a plane of symmetry 20 positioned between the input side 12 and the output side 16, and an integrally fabricated polarization rotator 22 integrally positioned at the plane of symmetry 20. The integrally fabricated polarization rotator 22 can be constructed so as to convert a TM signal to a TE signal, or a TE signal to a TM signal. The polarization rotator can be constructed using the method shown and described in U.S. Ser. No. 11/222,358, filed Sep. 8, 2005, the entire content of which is hereby expressly incorporated by reference herein in its entirety. Where referred to herein the input side 12 can be, in an alternate embodiment, an output side; and the output side 16 can be, in an alternate embodiment, an input side. The integrally fabricated polarization rotators of the present invention can be constructed as part of the design of any symmetric optical circuit, including but not limited to, Mach-Zehnder optical circuits and arrayed waveguide grating optical circuits.

Figure 6:
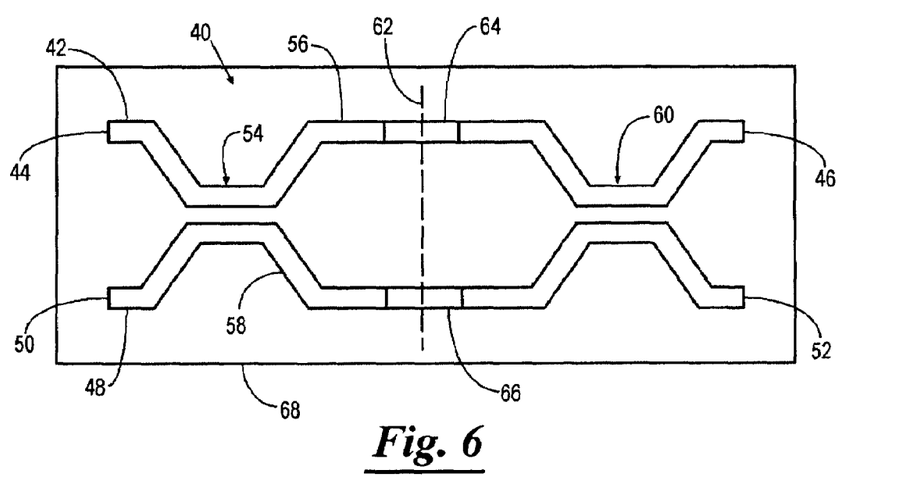
FIG. 6 is a schematic of a Mach-Zehnder type optical circuit having a pair of integrally fabricated polarization rotators as constructed in accordance with the present invention.

An example of a Mach-Zehnder (MZ) circuit having an integrally fabricated polarization rotator is shown in FIG. 6. The MZ circuit referred to therein by reference numeral 40, is similar to the general Mach-Zehnder circuit of FIG. 3. The MZ circuit 40 comprises a first circuit 42 (e.g., fiber or waveguide) having an input end 44 and an output end 46, and a second circuit 48 (e.g., fiber or waveguide) having an input end 50 and an output end 52. The MZ circuit 40 has a first directional coupler 54. A first arm 56 and a second arm 58 extend from the first directional coupler 54 and are rejoined at a second directional coupler 60. The MZ circuit 40 has a plane of symmetry 62 between the first directional coupler 54 and the second directional coupler 60. A first integrally fabricated polarization rotator 64 is constructed in first arm 56 at the plane of symmetry 62 and a second integrally fabricated polarization rotator 66 is constructed in second arm 58 at the plane of symmetry 62. MZ circuit 40 shown in FIG. 6 is but one type of MZ circuit contemplated for use herein. MZ circuit 40 is positioned on a substrate 68 such as any substrate used in the construction of on-chip optical circuits. In fact any type of MZ circuit may be configured to incorporate the integrally fabricated polarization rotators of the present invention.

Figure 7:
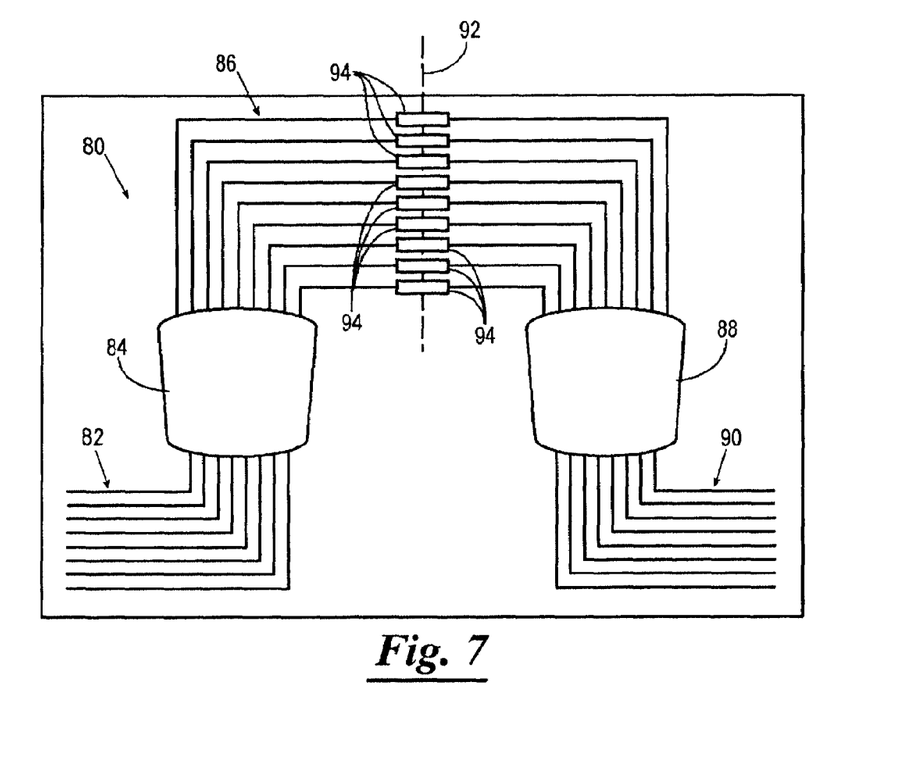
FIG. 7 is a schematic of an Arrayed Waveguide Grating optical circuit having a plurality of integrally fabricated polarization rotators as constructed in accordance with the present invention.

An example of an AWG-type circuit having an integrally fabricated polarization rotator is shown in FIG. 7. The AWG circuit referred to therein by reference numeral 80 is similar to the AWG circuit shown in FIG. 4. The AWG circuit 80 comprises a plurality of input fibers or waveguides 82 which enter into an input free space region 84 which is coupled to an array of array fibers or waveguides 86 which in turn enter an output free space region 88 wherein the optical signals passing therethrough are refocused and exit through a plurality of output fibers or waveguides 90. The AWG 80 has a plane of symmetry 92 which passes through the array fibers or waveguides 86 and wherein is positioned an integrally fabricated polarization rotator 94 in each array fiber or waveguide 86. The polarization rotator 94 is constructed, for example, in the manner described herein for fabricating integral, monolithic polarization rotators. The AWG 80 is constructed on a substrate 96 which may be any type of substrate known in the art of optical circuit chip construction.

As indicated above, the symmetric optical circuits contemplated herein are constructed to have polarization rotators which are integrally fabricated therein such that the optical circuits are monolithic, solid state circuits.

The monolithic solid state optical circuits of the present invention preferably comprise polarization rotators as configured and constructed as discussed below and as shown in FIGS. 8-13D. A waveguide structure 110 represented in FIG. 8 includes an input conditioning section 114, an output conditioning section 118, and a polarization rotator 122 disposed between the input conditioning section 114 and the output conditioning section 118. In general, an electromagnetic signal is incident upon or enters the waveguide structure 110 via the input conditioning section 114, and propagates from the input conditioning section 114 through the polarization rotator 122 to the output conditioning section 118, where the electromagnetic signal exits the waveguide structure 110. As the electromagnetic signal propagates through the polarization rotator 122, the state of polarization of the electromagnetic signal is rotated. Preferably, the polarization rotator 122 is constructed so as to rotate the polarization of the electromagnetic signal by about ninety-degrees.

Figure 8:
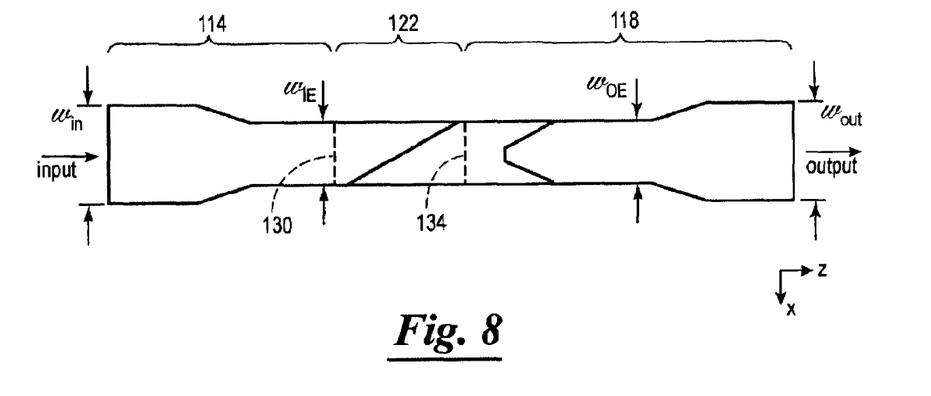
FIG. 8 is a top view of one embodiment of a waveguide structure forming a polarization rotator constructed in accordance with the present invention.

While the waveguide structure 110 is generally described herein in terms of the electromagnetic signal entering via the input conditioning section 114 and exiting via the output conditioning section 118 for purposes of clarity of discussion, it should be understood that the present invention also contemplates that alternatively, an electromagnetic signal can enter the waveguide structure 110 via the output conditioning section 118 and exit via the input conditioning section 114 for a reverse polarization rotation effect.

In general, the polarization rotation of the electromagnetic signal by the polarization rotator 122 is achieved in accordance with the present invention by a geometry of the polarization rotator 122. The geometry of the polarization rotator 122 is provided such that it introduces a gradually varying "twist" or rotation in the birefringent properties of the polarization rotator 122 along a length of the polarization rotator 122. In other words, the geometry of the polarization rotator 122 effectively rotates a birefringent axes of the polarization rotator 122 as a function of propagation distance.

As the electromagnetic signal propagates through the polarization rotator 122, the polarizations of the electromagnetic signal tend to line up with the birefringent axes of the polarization rotator 122. If the twist is slow enough through the polarization rotator 122, the polarization states of the electromagnetic signal will generally follow and rotate along with the birefringent axes of the polarization rotator 122, thereby inducing rotation of the polarization of the electromagnetic signal as the electromagnetic signal propagates through the polarization rotator 122. The effective rotation of the polarization is preferably about ninety degrees, which is equivalent to the energy in an initially TM mode transforming into a TE mode, and energy in an initially TE mode transforming into a TM mode. In other words, the polarization rotator 122 is capable of polarization "conversion".

Preferably, the geometry of the polarization rotator 122 is also provided such that there is minimal or no scattering or diffraction loss, and there is minimal or no power exchange or coupling between the two principle polarization states of the electromagnetic signal at any point in the polarization rotator 122. This criterion is known as the adiabatic condition. The adiabatic rotation of the polarization rotator 122 of the present invention is preferable to a coupled mode type rotation, such as that which occurs in half-wave plates, because the adiabatic mechanism of the polarization rotator 122 is generally wavelength independent and fabrication insensitive. Further, the adiabatic rotation of the polarization rotator 122 can be utilized to rotate all input states of polarization, whereas a half-wave plate only fully rotates states that are aligned at a forty-five degree angle to the birefringent axis of the plate.

The polarization rotator 122 of the waveguide structure 110 is shown independently and in more detail in FIGS. 9 and 10A-10D. As shown in one embodiment in FIG. 9, the polarization rotator 122 has an input end 130, an output end 134, and a midsection 138 having a overall length $l_{PR}$ which extends generally between the input end 130 and the output end 134. When an electromagnetic signal propagates through the polarization rotator 122, the electromagnetic signal generally travels along the overall length $l_{PR}$ of the midsection 138 from the input end 130 to the output end 134.

Figure 9:
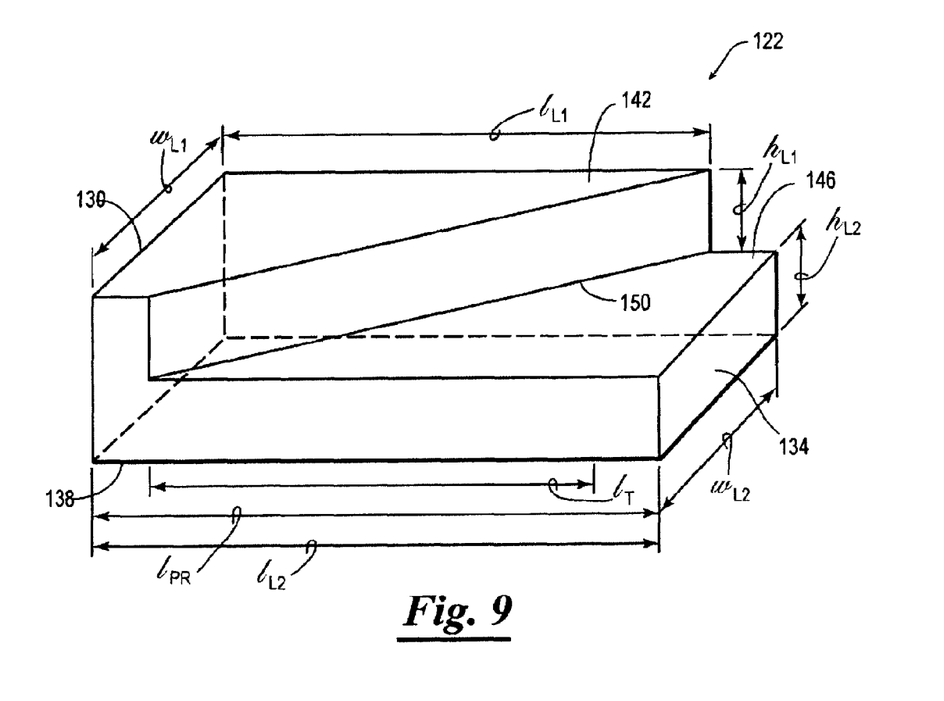
FIG. 9 is perspective view of one embodiment of the polarization rotator depicted in the waveguide structure of FIG. 8.

In one embodiment, to provide the polarization rotator 122 with a geometry that induces rotation of the electromagnetic signal as the electromagnetic signal propagates through the polarization rotator 122, the midsection 138 of the polarization rotator 122 includes a first level 142 and a second level 146, as best shown in FIG. 9. As such, the polarization rotator 122 is referred to herein as being "bi-level". Preferably, the first level 142 and the second level 146 are constructed so as to be integrated and function as a unified whole of the midsection 138. However, the first level 142 and the second level 146 are generally described herein in terms of discrete elements.

The first level 142 of the midsection 138 has a length $l_{L1}$, a width $w_{L1}$, and a height $h_{L1}$; and the second level 146 of the midsection 138 has a length $l_{L2}$, a width $w_{L2}$, and a height $h_{L2}$. The first level 142 is disposed adjacent the second level 146 such that generally the lengths $l_{L1}$ and $l_{L2}$ are aligned, the widths $w_{L1}$ and $w_{L2}$ are aligned, and the heights $h_{L1}$ and $h_{L2}$ are aligned.

The first level 142 of the midsection 138 is constructed such that the width $w_{L1}$ of the first level 142 decreases along the length $l_{L1}$ of the first level 142, while the second level 146 of the midsection 138 is constructed such that the width $w_{L2}$ of the second level 146 is substantially constant along the length $l_{L2}$ of the second level 146. Preferably, the decrease in the width $w_{L1}$ of the first level 142 starts at a distance $d_{IE}$ from the input end 130 of the polarization rotator 122, as shown best in FIG. 10A. Also, the width $w_{L1}$ of the first level 142 preferably decreases to a width equal to zero at a distance $d_{OE}$ from the output end 134 of the polarization rotator 122. As such, a lateral distance between the point of initial decrease of the width $w_{L1}$ of the first level 142 to the point where the width $w_{L1}$ is zero, which is referred to herein as a taper length $l_T$, is less than the length $l_{PR}$ of the midsection 138.

Figure 10A:
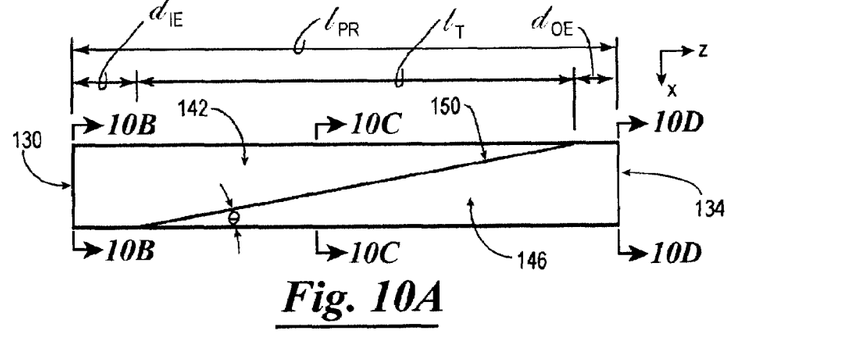
FIG. 10A is a top view of the polarization rotator depicted in FIG. 9.
Figure 10B:
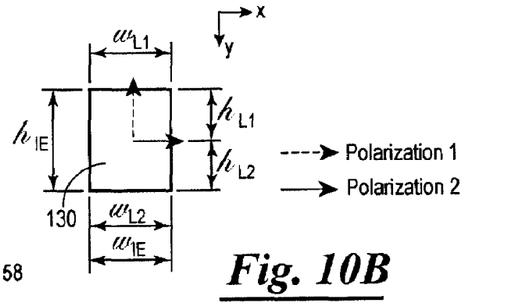
FIG. 10B is a cross sectional view of the polarization rotator depicted in FIG. 10A taken along the line 10B-10B of FIG. 10A.

As shown best in FIG. 10A, a line 150 demarcates the boundary between the first level 142 and the second level 146. It can be seen that the slope of the line 150 generally defines the relationship between at least a portion of the length $l_{L1}$ of the first level 142 (which essentially corresponds to the taper length $l_T$) and the width $w_{L1}$ of the first level 142. In one embodiment, the first level 142 is constructed such that the width $w_{L1}$ of the first level 142 decreases gradually and continuously, thereby providing the line 150 with a slope that is substantially constant. As such, the line 150 slopes in a monotonic linear or straight fashion and provides the first level 142 with a substantially wedge shape, as shown for example in FIGS. 9 and 10A. Also, because the slope is constant, it can be seen that the slope can equivalently be defined by a taper angle θ.

Although the slope and shape of the line 150 demarcating the boundary between the first level 142 and the second level 146 of the midsection 138 is described in one embodiment as being substantially constant, the slope and shape of the line 150 (and thus the rate of change of the width $w_{L1}$ of the first level 142 with respect to at least a portion of the length $l_{L1}$) can be varied. More optimum shapes may be used in order to achieve a minimum length for a certain amount of insertion loss or other criteria. For example, in the embodiment of the polarization rotator 122 depicted in FIG. 8, polarization rotation tends to occur more towards the center of the polarization rotator 122. Because, little rotation occurs near the input end 130 and the output end 134 of the polarization rotator 122, the slope in the portions near the input end 130 and the output end 134 can be more abrupt than near the center of the polarization rotator 122 without substantially changing the adiabatic quality of the polarization rotator 122.

Figure 11:
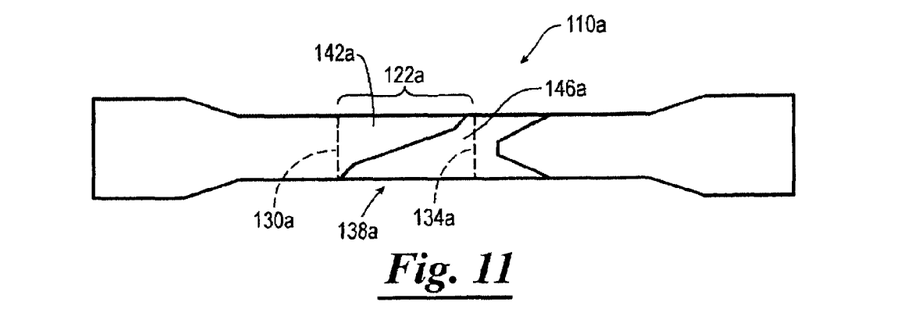
FIG. 11 is a top view of another embodiment of a waveguide structure forming a polarization rotator constructed in accordance with the present invention.

For example, shown in FIG. 11 and labeled by the reference numeral 110a is another embodiment of a waveguide structure constructed in accordance with the present invention. The waveguide structure 110a shown in FIG. 11 has a polarization rotator 122a that is similar to the polarization rotator 122 of the waveguide structure 110 shown in FIG. 8 in that the polarization rotator 122a of the waveguide structure 110a has an input end 130a (shown in phantom), an output end 134a (shown in phantom), and a midsection 138a having a first level 142a and second level 146a. However, for the polarization rotator 122a shown in FIG. 11, portions of the first level 142a of the midsection 138a have a slope that tapers in differing amounts or at different rates near the input end 130a and the output end 142a of the polarization rotator 122.

Also, while the width $w_{L1}$ of the first level 142 of the polarization rotator 122 is described above in one embodiment as decreasing gradually and continuously, it should be understood that the width $w_{L1}$ can be decreased periodically to form a step-like boundary, or in any other suitable manner of gradual and/or abrupt discontinuites so long as the overall geometry of the midsection 138 induces rotation of the polarization of the electromagnetic signal. However, the rate of change of the width $w_{L1}$ of the first level 142 of the polarization rotator 122 is preferably gradual so that the rate of change is adiabatic, i.e., so that generally no loss or mode coupling results.

Referring again to the waveguide structure 110 shown in FIG. 8, the geometry of the polarization rotator 122 resulting from the decrease in the width $w_{L1}$ of the first level 142 of the midsection 138 along the length $l_{L1}$ of the first level 142 is further illustrated best by the cross sectional views of FIGS. 10A-10D, which are taken at various points between the input end 130 and the output end 134 of the polarization rotator 122. It can be seen in FIG. 10B that the cross section taken near the input end 130 has a generally rectangular shape resulting from the collective widths $w_{L1}$ and $w_{L2}$ and the heights $h_{L1}$ and $h_{L1}$ of the first level 142 and the second level 146, respectively. In other words, the first level 142 and the second level 146 of the midsection 138 cooperate to form the input end 130 of the polarization rotator 122. As such, the input end 130 of the polarization rotator 122 has an overall width $w_{IE}$ and an overall height $h_{IE}$ that corresponds to the collective widths $w_{L1}$ and $w_{L2}$ and the heights $h_{L1}$ and $h_{L2}$ of the first level 142 and second level 146, respectively.

Figure 10C:
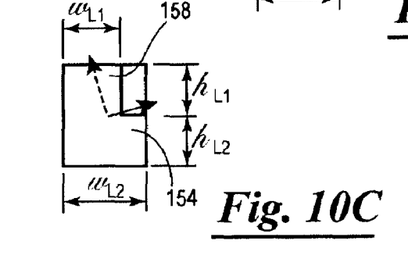
FIG. 10C is a cross sectional view of the polarization rotator depicted in FIG. 10A taken along the line 10C-10C of FIG. 10A.

In FIG. 10C, it can be seen that at a point taken around the middle of the midsection 138, the cross section has a generally "L" shape. The "L" shape has a horizontal or "arm" portion 154, which results from the width $w_{L2}$ and the height $h_{L2}$ of the second level 146 of the midsection 138, and a vertical or "panhandle" portion 158, which results from the width $w_{L1}$ and height $h_{L1}$ of the first level 142 of the midsection 138. As discussed above, the width $w_{L2}$ of the second level 146 preferably does not change along the length $l_{L2}$ of the second level 146, and thus the arm portion 154 remains substantially constant in the cross section view along the length $l_{L2}$. However, the width $w_{L1}$ of the first level 142 decreases along the length $l_{L1}$ of the first level 142, and thus the panhandle portion 158 decreases along the length $l_{L1}$ until at some point the panhandle portion 158 is no longer present in the cross section view (preferably at a point near the output end 134) as shown in the cross section of FIG. 10D.

Figure 10D:
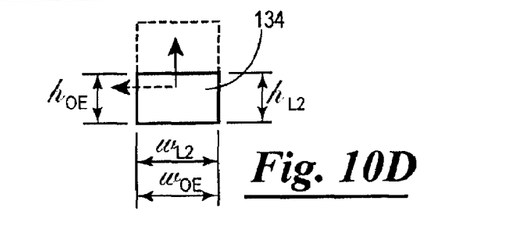
FIG. 10D is a cross sectional view of the polarization rotator depicted in FIG. 10A taken along the line 10D-10D of FIG. 10A.

In other words, the width $w_{L1}$ of the first level 142 is preferably decreased such that only the second level 146 of the midsection 138 substantially forms the output end 134 of the polarization rotator 122. As such, the output end 134 of the polarization rotator 122 has an overall width $w_{OE}$ and an overall height $h_{OE}$ that corresponds to the width $w_{L2}$ and the height $h_{L2}$ of the second level 146. Therefore, it can be seen that the height $h_{OE}$ of the output end 134 will generally be less than the height $h_{IE}$ of the input end 130. Also, while the width $w_{OE}$ at the output end 134 of the polarization rotator 122 is preferably the same as the width $w_{IE}$ at the input end 130, it should be understood that the width $w_{OE}$ at the output end 134 of the polarization rotator 122 may also be different than the width $w_{IE}$ at the input end 130.

At the input end 130, the polarization rotator 122 is capable of supporting at least two modes: the TM mode, the TE mode, and combinations thereof. The TM mode is generally described herein as being polarized along the vertical direction (or the y-direction shown in the cross section of FIG. 10B). The TE mode is generally described herein as being polarized along the horizontal direction (or the x-direction shown in the cross section FIG. 10B). Preferably, the width $w_{IE}$ of the input end 130 of the polarization rotator 122 is small enough in relation to the height $h_{IE}$ of the input end 130 such that the mode with the largest effective index is the TM mode. In other words, the height $h_{IE}$ is preferably greater than the width $w_{IE}$ at the input end 130. As such, the input end 130 of the polarization rotator 122 is described and shown herein in one embodiment as having a cross section with a vertically oriented rectangular shape. However, it should be understood that the polarization rotator 122 can be constructed such that the input end 130 is provided with another shape in accordance with the present invention, such as for example an oval or trapezoidal shape.

Similar to the input end 130, the output end 134 of the polarization rotator 122 also supports the TM mode, the TE mode, and combinations thereof. However, the height $h_{OE}$ of the output end 134 of the polarization rotator 122 is preferably made small enough in relation to the width $w_{OE}$ of the output end 134 such that the mode with the largest effective index is the TE mode. In other words, the height $h_{OE}$ is preferably less than the width $w_{OE}$ at the output end 134 of the polarization rotator 122. As such, the output end 134 is described and shown herein in one embodiment as having a cross section with a horizontally oriented rectangular shape. However, it should be understood that the polarization rotator 122 can be constructed such that the output end 134 is provided with another shape in accordance with the present invention, such as for example an oval or trapezoidal shape.

This changing geometry of the midsection 138 effectively rotates a birefringent axes of the polarization rotator 122 as a function of propagation distance by about ninety degrees, and thus effectively rotates the polarization states of the electromagnetic signal as it travels from the input end 130 to the output end 134 of the polarization rotator 122. The direction of the principal polarization directions of the electromagnetic signal will depend on the geometry of the polarization rotator 122, and more particularly on the width $w_{L1}$ of the panhandle portion 158. If the width $w_{L1}$ of the panhandle is nearly as wide as the width $w_{L2}$ of the arm portion 154 of the "L" shape, such as near the input end 130, the mode with the highest effective index is TM polarized (or vertically polarized). If the width $w_{L1}$ of the panhandle portion 158 is very narrow with respect to the width $w_{L2}$ of the arm portion 154, such as near the output end 134, the mode with the highest effective index is TE polarized (or horizontally polarized). When the width $w_{L1}$ of the panhandle portion 158 varies gradually, the principal directions of polarization will rotate therewith. As such, the principal polarization directions of the electromagnetic signal in the "L" shape portion of the midsection 138 will generally not line up with the vertical or horizontal directions of the polarization rotator 122, as shown best in the cross section of FIG. 10C. In other words, the principal modes in the "L" shape portion of the midsection 138 will generally not be purely TE or TM polarized.

The input conditioning section 114 is generally a waveguide that transforms some width $w_{in}$ (e.g., that corresponds to a width of a connecting waveguide element such as a fiber optic or fiber optic connector) into a desirable width corresponding to the width $w_{IE}$ of the input end 130 of the polarization rotator 122. Preferably, the transition between the width $w_{in}$ and width $w_{IE}$ is caused through a simple lateral waveguide taper.

The output conditioning section 118 transforms a width corresponding to the width $w_{OE}$ of the output end 134 of the polarization rotator 122 to some desired width $w_{out}$. Further, the output conditioning section 118 restores a height corresponding to the height $h_{OE}$ of the output end 134 of the polarization rotator 122 to a desire height $h_{out}$ (e.g., that corresponds to the original height $h_{IE}$ of the input end), without disturbing the polarization states or causing the states to rotate. Preferably, the transition between the width $w_{OE}$ and the width $w_{out}$ is caused through a simple lateral waveguide taper. The transition between the height $h_{OE}$ and the height $h_{out}$ is preferably caused by a bi-level waveguide pattern that is symmetric, i.e., that is shaped so as to have a mirror symmetry along the center of the output conditioning section 118. For example, as shown in FIG. 8, the output conditioning section 118 can be provided with a wedge shaped pattern that is centered in the middle of the output conditioning section 118.

Referring now to FIGS. 12A-12F, which cooperate to show one method for fabricating the waveguide structure 110 using a etching technique. As shown best in FIGS. 12A and 12B, the etching process begins with a starting structure that includes a waveguide 200. The buried waveguide 200 has a core material 202 with an index of $n_{co}$ that is at least partially buried or disposed within a cladding material 204 having an index of $n_{cl}$.

Polarization rotation is facilitated by using material systems that have core-to-clad refractive index contrasts that are large (e.g., $n_{co}-n_{cl}/n_{cl}>\sim 0.02$). In high index contrast waveguides, the change in geometrical shape of the waveguide, such as creating rectangles or "L" shaped waveguides in accordance with the present invention, introduces larger form-birefringence. Larger form-birefringence allows polarization rotation to occur over shorter lengths and with less polarization coupling (or degradation of the performance). In one embodiment, the core material 202 of the waveguide 200 is constructed of a material selected from a group consisting of silicon, silicon nitride, silicon oxynitride, silicon oxycarbide, germanium doped silica, indium phosphide, gallium arsenide, high index polymers, and combinations thereof; and the cladding material 204 is constructed of a material selected from a group consisting of silica, lower index silicon oxynitride, lower index silicon oxycarbide, indium phosphide, gallium arsenide, polymers, and combinations thereof.

Figures 12A, 12B:
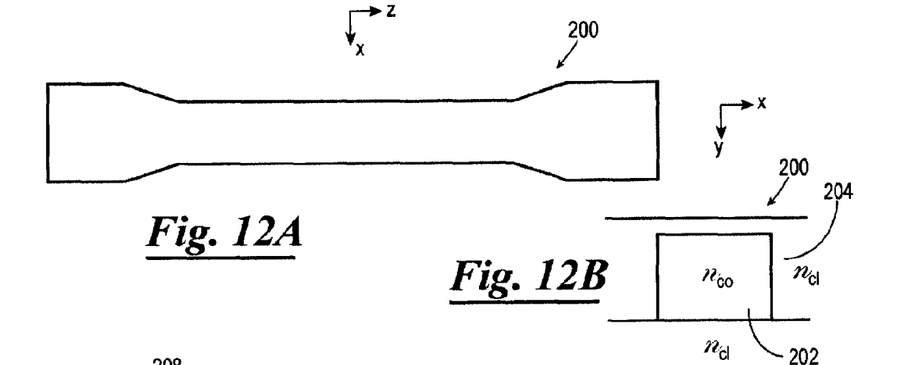
FIG. 12A is a top view of a starting structure.
FIG. 12B is a cross sectional view of the starting structure depicted in FIG. 12A.
Figures 12C, 12D:
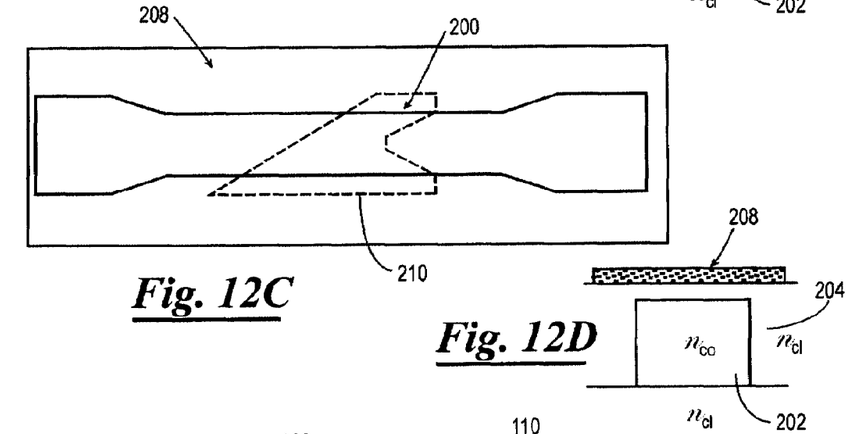
FIG. 12C is a top view of a photoresist layer on the starting structure depicted in FIG. 12A.
FIG. 12D is a cross sectional view of the photoresist layer and the starting structure depicted in FIG. 12A.

In a next step of the etching method, a photoresist layer 208 is disposed on the waveguide 200, as shown in FIGS. 12C and 12D. An opening 210 having a desired shape corresponding to the shape of the first level 142 of the polarization rotator 122 is patterned in the photoresist layer 208 over the waveguide 200, as shown best in FIG. 12C. Preferably, any additional patterns for the waveguide structure 110, such as for example the pattern for the output conditioning section 118 is also included in shape of the opening 210 of the photoresist layer 208 so that the patterns can be formed together.

Figures 12E, 12F:
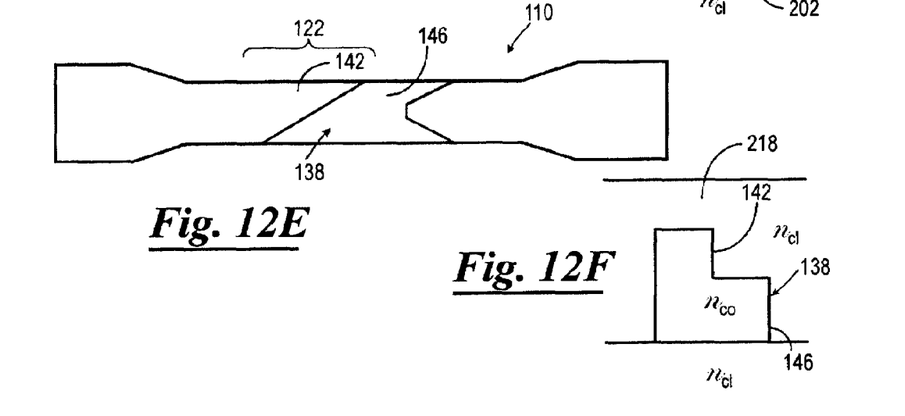
FIG. 12E is a top view of a waveguide structure after etching has been performed on the photoresist layer and starting structure depicted in FIG. 12A.
FIG. 12F is a cross sectional view of the waveguide structure depicted in FIG. 12A.

In general, the photoresist layer 208 is constructed of a material that prevents material beneath the photoresist layer 208 from being removed during the etching process. Thus, during etching, the exposed area resulting from the opening 210 in the photoresist layer 208 is removed to a proper depth, and the pattern of the opening 210 is transferred into the waveguide 200, as shown in FIGS. 12E and 12F. As such, the first level 142 and second level 146 of the polarization rotator 122, and the output conditioning section 118, are formed. After the etching process is complete, another layer of cladding material 218 is deposited over the entire structure and planarized if needed, as shown best in FIG. 12F.

It should be noted that the optimum polarization conversion is a result of both the initial etch pattern and also the etch depth. However, since the rotation mechanism of the polarization rotator 122 is adiabatic, it is expected that the performance characteristics of the polarization rotator 122 fabricated utilizing the etching method discussed above will have wide latitude in both fabrication and design.

Figure 13A:
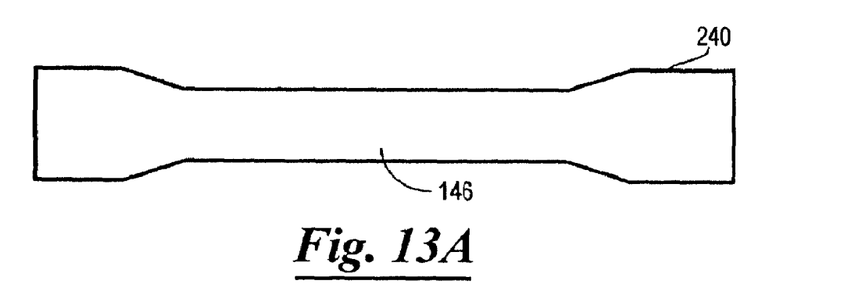
FIG. 13A is a top view of a first layer of a waveguide structure.
Figure 13B:
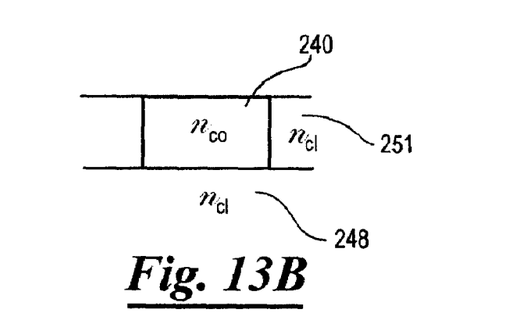
FIG. 13B is a cross sectional view of the first layer depicted in FIG. 13A.
Figure 13C:
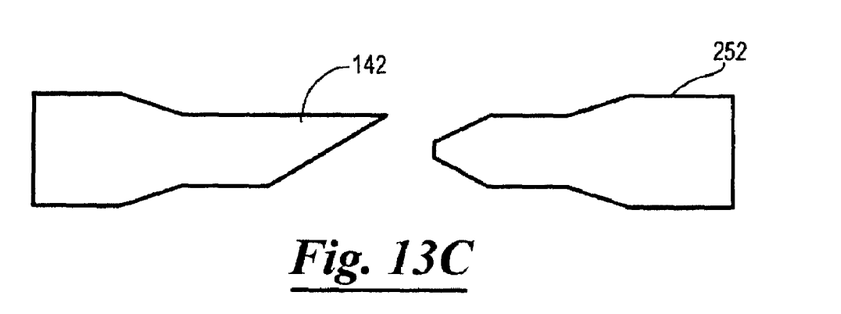
FIG. 13C is a top view of a second layer of the waveguide structure which is disposed onto the first layer depicted in FIG. 13A.
Figure 13D:
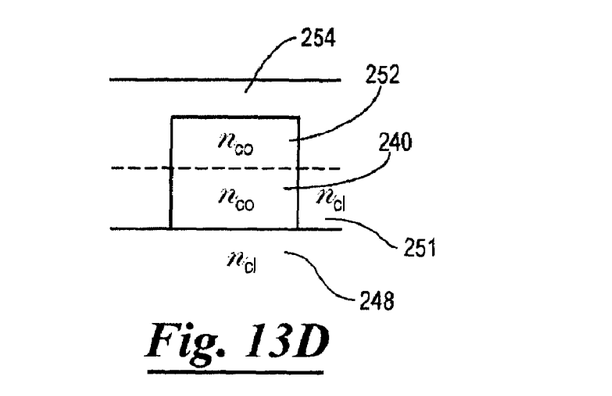
FIG. 13D is a cross sectional view of the second layer depicted in FIG. 13C disposed on the first layer depicted in FIG. 13A.

Referring now to FIGS. 13A-13D, shown therein is a method for fabricating the waveguide structure 110 using a layering technique. Preferably, this fabrication method uses two photomasks and two deposition steps, rather than a deposition and then an etch step as discussed above with reference to FIGS. 12A-12F. In the layering embodiment, the net waveguide structure 110 is realized by depositing at least two independent core layers having a refractive index $n_{co}$, one on top of the other. Preferably, a first reticle mask (not shown) is used to pattern a first layer of core material 240 on a layer of cladding material 248 to form a lower portion of the waveguide geometry of waveguide structure 110, as shown in FIGS. 13A and 13B. Preferably, the first layer of core material 240 is patterned such that the lower portion includes the second level 146 of the polarization rotator 122. Another layer of cladding material 251 having an index $n_{cl}$ is preferably deposited over the first layer of core material 240 and planarized right down to the top surface of the first layer of core material 240, ensuring that there is no remaining cladding material 248 over the top of the first layer of core material 240, as best shown in FIG. 13B. A second layer of core material 252, as shown in FIG. 13C, is then deposited onto the first layer of core material 240, as shown in FIG. 13D, using a second mask (not shown) to pattern the top portion of the waveguide geometry. Preferably, the second layer of core material 252 is patterned such that the top portion includes the first level 142 of the polarization rotator 122. Another layer of cladding material 254 can then be deposited over the entire surface and planarized if necessary, as shown in FIG. 13D.

The deposition process of the layering method discussed above can be performed using any appropriate process currently available or later developed. For example, layering can be performed by using the methods for chemical vapor deposition described in U.S. Pat. Nos. 6,614,977 and 6,771,868 and in the patent application identified by the U.S. Ser. No. 10/837,682, each of which is entitled "Use of Deuterated Gases for the Chemical Vapor Deposition of Thin Films for Low-Loss Optical Devices and Waveguides"; the entire contents of which are hereby expressly incorporated herein by reference.

An advantage of the layering fabrication method compared to the etching fabrication method discussed above is that the resulting structure can be more general. The etching method discussed above with reference to FIGS. 12A-12F generally allows for features to be etched in an existing waveguide. The layering method described above with reference in FIGS. 13A-13D allows for more arbitrary orientation of the two layers 240 and 252 of the waveguide structure 110.

While the above methods for fabricating the waveguide structure 110 of the present invention are described above in terms of fabricating one waveguide structure 110, it should be apparent to those skilled in the art that such fabrication methods, as well as any other appropriate fabrication techniques currently known in the art or later developed, can be utilized to fabricate one or more of the waveguide structure 110, or portions thereof, such as when one or more waveguide structures are included on a chip, or on a wafer (e.g., a silicon wafer) having a plurality of chips.

Although the foregoing invention has been described in some detail by way of illustration and example for purposes of clarity of understanding, it will be apparent to those skilled in the art that certain changes and modifications may be practiced without departing from the spirit and scope of the present invention, as described herein. As such, those skilled in the art will appreciate that the conception upon which this disclosure is based may readily be utilized as a basis for the designing of other structures, methods, and systems for carrying out the several purposes of the present invention. As such, it should be understood that the invention is not limited to the specific and preferred embodiments described herein, including the details of construction and the arrangements of the components as set forth in the above description or illustrated in the drawings. Further, it should be understood that the phraseology and terminology employed herein are for the purpose of description and should not be regarded as limiting.

What is claimed is:

1. A Mach-Zehnder circuit, comprising:
a first directional coupler;
a second directional coupler; and
first and second arms provided between the first and second directional couplers, the first arm including a waveguide having a length extending in a first direction and a width extending in a second direction transverse to the first direction, the waveguide including, first, second and third portions, the third portion being provided between the first and second portions, wherein the width of the waveguide is substantially uniform in the third portion, the width of the waveguide in the first portion narrows in the first direction such that the first portion includes a first tapered part, and the width of the waveguide in the second portion narrows in the first direction such that the second portion includes a second tapered part, the second portion being configured to rotate a polarization of light propagating in the first direction in the waveguide.

2. The Mach-Zehnder circuit of claim 1 wherein the second portion is configured to rotate the polarization of the light propagating in the waveguide by substantially ninety degrees.

3. The Mach-Zehnder circuit of claim 1 wherein the second portion of the waveguide includes a material selected from a group consisting of silicon, silicon nitride, silicon oxynitride, silicon oxycarbide, germanium doped silica, indium phosphide, gallium arsenide, high index polymers, and combinations thereof.

4. The on Mach-Zehnder circuit of claim 1 wherein the Mach-Zehnder circuit is monolithic.

5. An arrayed waveguide grating (AWG) circuit, comprising:
a first free space region;
a second free space region; and
a plurality of waveguides provided between the first and second free space regions, one of the plurality of waveguides having a length extending in a first direction and a width extending in a second direction transverse to the first direction, said one of the plurality of waveguides including, first, second and third portions, the third portion being provided between the first and second portions, wherein the width of said one of the plurality of waveguides is substantially uniform in the third portion, the width of said one of the plurality of waveguides in the first portion narrows in the first direction such that the first portion includes a first tapered part, and the width of said one of the plurality of waveguides in the second portion narrows in the first direction such that the second portion includes a second tapered part, the second portion being configured to rotate a polarization of light propagating in the first direction in said one of the plurality of waveguides.

6. The AWG circuit of claim 5 wherein the second portion is configured to rotate the polarization of the light propagating in the waveguide by substantially ninety degrees.

7. The AWG circuit of claim 5 wherein the second portion includes a material selected from a group consisting of silicon, silicon nitride, silicon oxynitride, silicon oxycarbide, germanium doped silica, indium phosphide, gallium arsenide, high index polymers, and combinations thereof.

8. The AWG circuit of claim 5 wherein the AWG circuit is monolithic.

* * * * *